3,274,009
REFRACTORY COMPOSITION
Luther M. Foster, Chappaqua, N.Y., and George Long, Naperville, Ill., assignors to Aluminum Company of America, Pittsburgh, Pa., a corporation of Pennsylvania
No Drawing. Filed Feb. 9, 1965, Ser. No. 431,458
2 Claims. (Cl. 106—65)

This is a continuation-in-part of application Serial No. 194,657, filed May 14, 1962, now abandoned.

This invention relates to a composition of matter and more particularly to a refractory composition made by sintering or fusing particles of aluminum nitride and alumina. The refractory made from the composition is hard, vitreous and dense, and possesses substantial isotropic properties making it particularly useful in applications where high resistance to thermal shock is desirable.

In many instances it is of prime importance that refractory bodies be highly resistant to thermal shock and mechanically strong. For instance, one very important quality that spark plug insulators must have, in view of the violent temperature changes to which they are subjected, is high resistance to thermal shock.

Both alumina and aluminum nitride are used as refractory materials. Alumina, particularly alpha-alumina, is commonly used for making spark plug insulators as it affords a combination of various characteristics desirable for such use. The coefficient of thermal-expansion of both sintered alumina and aluminum nitride is relatively high when compared with ordinary ceramic materials. In the case of spark plug insulators it is desirable to use an insulator material having high thermal-expansion relative to ordinary ceramic materials, since the insulators are customarily employed in conjunction with metal parts which have coefficients of thermal-expansion higher than that of ordinary ceramic materials.

A material having a cubic crystal structure (isotropic) will generally expand and contract equally along axes of the crystals in all directions when subjected to repeated cycles of heating and cooling. A refractory composition having high mechanical strength and a cubic crystal structure would produce a refractory body highly resistant to cracking due to thermal-shock because of the relatively equal expansion of the crystals in all directions.

It is the object of this invention to provide a refractory having high mechanical strength, a relatively high coefficient of thermal expansion when compared to ordinary ceramic materials, and excellent resistance to cracking when subjected to thermal shock by employing a sintered or fused refractory composition consisting of aluminum nitride and alumina in such proportions that the crystal structure thereof is cubic.

In accordance with the present invention, a refractory composition is produced by sintering or fusing a mixture of particles of aluminum nitride and alumina. Both aluminum nitride and alumina crystals have hexagonal structures. It has been found, however, that when a mixture of particles consisting essentially of alumina and 9% to 12% by weight of aluminum nitride is sintered or fused, the crystal structure is converted from hexagonal to cubic. If desired, other materials may be added to this mixture provided they do not interfere with converting the crystal structure to a cubic crystal structure. To obtain a refractory composition having a crystal structure which is substantially all cubic the mixture should consist essentially of 9% to 12% by weight of aluminum nitride and 91% to 88% by weight of alumina. A mixture other than within the latter stated ranges will not be substantially all converted to the cubic crystal structure when vitrified. The phrase "substantially all cubic" means that at least 90% of the crystal structure of the refractory composition is in the cubic form. The cubic crystal structure of the composition may be determined from analysis by X-ray defraction powder patterns. The amount of the crystal structure of the refractory composition which is cubic may be determined by quantitative lineal analysis of photomicrographs of a sample of the material or by microscopic inspection of the sample. For a general discussion of lineal analysis procedure, see Metals Technology (AIME), vol. 14, 1947), Technical Publication No. 2215 entitled, "Quantitative Metallography by Point-Counting and Lineal Analysis" by R. J. Howard and M. Cohen.

A refractory having this composition may be produced by either sintering or fusing a mixture of particles of aluminum nitride and alumina in the above-described proportions, and preferably by sintering. This vitrification may be accomplished in any suitable sintering or fusion operation. In such a vitrifying operation the mixture which may be molded into some desirable shape, is heated in an inert atmosphere at a temperature of at least 1500° C. and for sufficient time to convert the crystal structure from hexagonal to cubic. In general, the higher the temperature employed, the shorter the period of time necessary to sinter the mixture to achieve this conversion of the crystal structure. Sintering at a temperature above 2000° C. is usually not desirable as the aluminum nitride will tend to decompose into its elements. Generally, cubic crystals are produced when the mixture is sintered at a temperature between 1500° C. and 2000° C. for a period of from 30 to 90 minutes. Should it be desirable to fuse the mixture the temperature should be at least 2000° C. When fusing the mixture, a temperature above 2300° C. is undesirable due to the high rate of decomposition of the aluminum nitride.

What is claimed is:
1. A vitrified refractory composition having a crystal structure which is at least 90% cubic and consisting essentially of alumina and 9% to 12% by weight of aluminum nitride.
2. A vitrified refractory composition having a crystal structure which is at least 90% cubic and consisting essentially of aluminum nitride in the amount of 9% to 12% by weight, and 91% to 88% by weight of alumina.

References Cited by the Examiner
UNITED STATES PATENTS
2,480,475   8/1949   Johnson _____ 106—65

TOBIAS E. LEVOW, Primary Examiner.
J. E. POER, Examiner.